(12) United States Patent
Borders et al.

(10) Patent No.: US 10,661,696 B2
(45) Date of Patent: May 26, 2020

(54) VEHICLE INSERT AND METHOD OF VEHICLE LOADING AND UNLOADING

(71) Applicant: HDS Global, Inc.

(72) Inventors: Louis H. Borders, Palo Alto, CA (US); Aravind Durai, Palo Alto, CA (US); Richard Oas, Palo Alto, CA (US)

(73) Assignee: HDS MERCURY, INC., Palo Alto, CA (US)

( * ) Notice: Subject to any disclaimer, the term of this patent is extended or adjusted under 35 U.S.C. 154(b) by 260 days.

(21) Appl. No.: 15/425,633

(22) Filed: Feb. 6, 2017

(65) Prior Publication Data

US 2017/0225601 A1    Aug. 10, 2017

Related U.S. Application Data

(60) Provisional application No. 62/291,352, filed on Feb. 4, 2016.

(51) Int. Cl.
| | |
|---|---|
| *B60P 1/64* | (2006.01) |
| *B60P 3/20* | (2006.01) |
| *B65G 67/20* | (2006.01) |
| *B60P 3/00* | (2006.01) |

(52) U.S. Cl.
CPC ............. *B60P 1/6418* (2013.01); *B60P 3/007* (2013.01); *B60P 3/20* (2013.01); *B65G 67/20* (2013.01)

(58) Field of Classification Search
CPC ..... B60P 1/6418; B60P 1/6436; B60P 1/6427; B60P 1/6472; B60P 3/20; B65G 1/023
See application file for complete search history.

(56) References Cited

U.S. PATENT DOCUMENTS

| | | | | |
|---|---|---|---|---|
| 2,330,339 | A * | 9/1943 | De More | F25D 11/003 62/239 |
| D259,715 | S | 7/1981 | Melilli | |
| 5,492,257 | A | 2/1996 | Demick | |
| 5,713,620 | A | 2/1998 | Port | |
| 6,666,362 | B1 | 12/2003 | LeTrudet | |
| 2002/0120475 | A1* | 8/2002 | Morimoto | B65D 5/4212 705/4 |
| 2014/0054916 | A1* | 2/2014 | Knudtson | B60P 3/007 296/24.3 |
| 2014/0219757 | A1* | 8/2014 | Wisniewski | B60P 1/00 414/541 |

* cited by examiner

*Primary Examiner* — Elizabeth J Martin
(74) *Attorney, Agent, or Firm* — Cherskov Flaynik Gurda, LLC

(57) ABSTRACT

A vehicle insert with refrigerated and non refrigerated sections for facilitating product distribution is described which uses a pair of frames defining a vertical member and one or more horizontal members. Several shelves with rollers are attached to the frames. The shelves define a sloped area wherein the lowest point on the shelves is located at a product retrieval point and wherein said insert is wheeled into a vehicle already loaded with product to be delivered.

17 Claims, 17 Drawing Sheets

VEHICLE INSERT AND METHOD OF VEHICLE LOADING AND UNLOADING

PRIORITY CLAIM

This application claims priority to a U.S. Provisional Application Ser. No. 62/291,352, filed on Feb. 4, 2016.

BACKGROUND OF THE INVENTION

1. Field of the Invention

The field of the invention is a vehicle insert and method of use of same to load and unload a vehicle.

2. Background of the Invention

In various embodiments, the invention provides a device and method for optimum transport of an assortment of products in light-duty to medium-duty transport vehicles.

In one embodiment, the invention comprises an insert for a light-duty transport vehicle, such as a van. The insert is made of a rigid frame with a base. The insert is removably received by the floor of the light-duty vehicle. The frame defines several shelving units, with one embodiment using four shelves. One or more storage bins, totes, cases, trays, or product boxes are loaded on the shelves, each storage unit defining a delivery or portion thereof. The light-duty vehicle provides a source of heat exchange, circulating air having different temperatures on various sections of the frame. In one embodiment, three different temperature handling options are provided for several levels defined by the frame. The frame is loaded with the storage units and is subsequently loaded into the light-duty vehicle, which can in this manner be loaded and unloaded in an expedited manner.

Traditionally, the last step of a delivery poses significant logistical challenges. For example, when delivering products to end-users residing on busy or residential streets, a large delivery truck cannot be used. A medium- or light-duty vehicle is more feasible, but the limited space in such a vehicle results the time-consuming need to organize and secure products during delivery. Furthermore, it is hard to accommodate both large products and small deliveries in one vehicle. Many deliveries are completed using a vehicle packed using an ad-hoc method, as optimized loading would take too long, require too many people, and provide too little return on the investment in time.

A need exists in the art for a device that can accommodate deliveries of items of various sizes while providing a means to organize orders for small items, while further optimizing space in a light-duty delivery vehicle.

SUMMARY OF INVENTION

An object of the invention is to create a method for optimizing the use of the interior of a light-duty vehicle. An advantage of the invention is that it allows for a vehicle to be used for final delivery steps while minimizing space and time requirements.

Another object of the invention is to facilitate optimum loading and unloading of vehicles. A feature of the invention is that only the removable frame is loaded and unloaded with products. An advantage of the invention is that it prevents time and space consuming loading and unloading of individual products and bins.

Yet another object of the invention is to provide a vehicle insert that can be loaded and unloaded using automated means. A feature of the invention is that the main body of the frame includes guide elements and comprises a material whose boundaries are optimized for use by computer vision systems. An advantage of one embodiment is that it can be loaded and unloaded with minimum human interaction.

A further object of the invention is to provide a system for tracking of loaded order components. A feature of the invention is that in one embodiment each order component is identified and scanned prior to loading on a vehicle frame. An advantage of the system is that it facilitates detailed tracking of every order.

Another object of the invention is to provide a means to transport order constituents requiring different temperature gradients during transport. A feature of the invention is in one embodiment, different amounts of cooling air are added to different levels in the frame. A benefit of the invention is that a single light-duty vehicle can be configured to transport products requiring different temperature ranges.

An additional object of the invention is to support reconfiguring the vehicle to transport varying quantities of over-sized goods. A feature of the invention is that different removable frame inserts have different sizes result in different internal configurations of the light-duty vehicle. A benefit of the system is that many different types of loads may be carried by a single vehicle with fast reconfigurations of the interior.

A further object of the invention is to provide a system to track temperature sensitive products along a transit route. A feature of the system is that in one embodiment all temperature information is recorded for the interior of the delivery vehicle and the cooled chambers of the insert as well as the individual containers. A benefit of the system is that it allows for verifiable transport of temperature sensitive products.

An additional object of the invention is to provide an efficient way to transport missed deliveries or returns. A feature of the invention is that the loading and unloading of each vehicle is optimized to support fast unloading while retaining the ability to collect returns or products where the delivery failed. A benefit of the invention is that in some embodiments, the vehicle supports a first in, first out order delivery system.

A further object of the invention is to provide a device for verifying delivery details. A feature of the invention is that, in one embodiment, the location of each container is known at any time. A benefit of the invention is that it allows an end-user to confirm the location and status of high value or highly anticipated product delivery.

An additional object of the invention is preventing waste. A feature of the invention is that multiple elements of the delivery chain are directly reusable and are picked up as others are dropped off. A benefit of the invention is that the end user bins or totes can be collected, readily reconditioned, and reused for further deliveries in a short timeframe.

A further object of the invention is to facilitate loading and unloading of light duty vehicles. A feature of the invention is that the removable frame is loaded with the bins, case packs, or totes while off the vehicle to allow for accelerated loading. A benefit of the invention is that a frame insert can be ready for conveyance by a vehicle upon arrival of the vehicle at the fulfillment center saving a portion of the time of loading and unloading.

An additional object of the invention is to provide an ergonomic system. In one embodiment, a feature of the invention is that bin or tote is stored on a shelf at an angle and can be removed with only minimal lifting of each container. In another embodiment, the entirely of the rack is proportional to the end user, so that the driver or operator can reach every shelf while standing on the ground or on the step bumper. A benefit of the system is that it allows for the removal of delivery components while requiring less brute force.

Another project of the invention is to allow loading and unloading of a van without many steps. A feature of the invention is that the driver does not have to get in and out of the vehicle many times to load or unload same. Instead, the vehicle can be loaded or unloaded in one step with the operator remaining outside. A benefit of the invention is that it facilitates fast loading and unloading while minimizing wear and tear on the vehicle.

Yet another object of the invention is to secure items during delivery. A feature of the invention is that order components will not shift and move during driving maneuvers including sudden braking. A benefit of the invention is that the anti-pushback devices prevent harm to the driver, vehicle, and delivery items.

A further object of the invention is to provide for zone temperature control. A feature of the invention is the ability to chill or freeze only a particular area of the insert or vehicle rack. A benefit of the invention is that it facilitates the conveyance of products having diverse temperature requirements while optimizing energy intensive cooling.

An additional object of the invention is to provide for highly accurate item delivery. A feature of the invention is that each component of an order is grouped with other order components. A benefit of the invention is the ability to retrieve required items for delivery without rummaging through the entirety of the interior of the vehicle.

A further object of the invention is to optimize space use within a mid-sized transport vehicle while maintaining accessibility to individual items. A feature of one embodiment of the invention is that the products on the rack are organized by delivery sequence while being stacked in a tight horizontal and vertical arrangement. A benefit of the invention is that it efficiently uses the internal space of the delivery vehicle while allowing individual items to be retrieved on demand.

A further object of the invention is to allow the operator to load and unload the truck without going up an incline. A feature of the invention is that the products can be loaded and unloaded with a vehicle that has a low ground clearance. A benefit of the invention is that products can be loaded and unloaded without the need to climb up and down a ramp or ladder.

A vehicle insert with refrigerated and non-refrigerated sections for facilitating product distribution is described wherein it uses multiple frames defining a vertical member and one or more horizontal members, and multiple roller shelves attached to said frames. The shelves play the role of maximizing the storage density within the van and present the containers precisely to the driver by the rear door for retrieval and wherein said insert is wheeled into a vehicle already loaded with containers to be delivered.

BRIEF DESCRIPTION OF DRAWING

The invention together with the above and other objects and advantages will be best understood from the following detailed description of the preferred embodiment of the invention shown in the accompanying drawings, wherein.

DETAILED DESCRIPTION OF THE INVENTION

Figure 1:
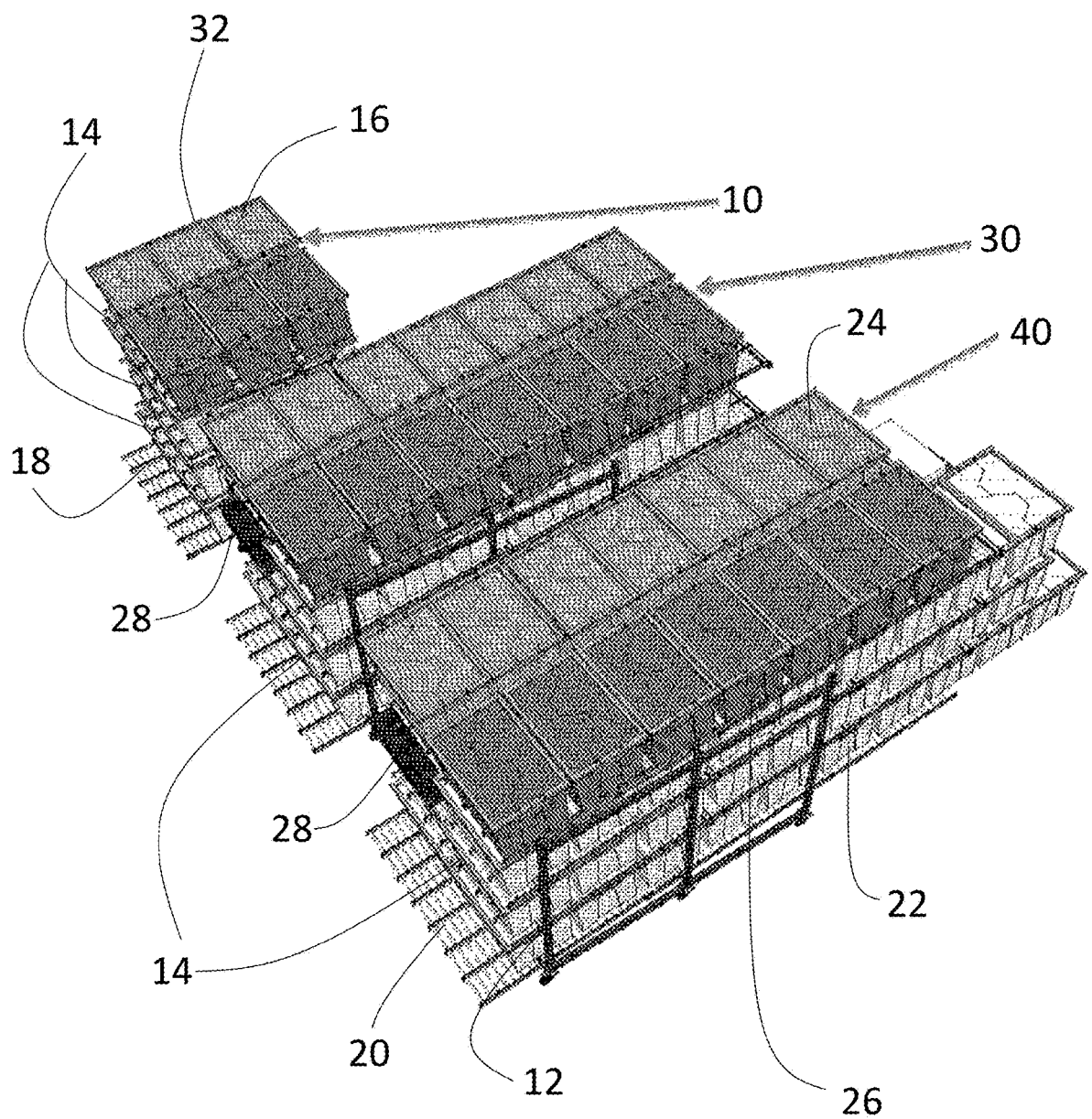
FIG. 1 depicts an overview of several embodiment of the invention.

The foregoing summary, as well as the following detailed description of certain embodiments of the present invention, will be better understood when read in conjunction with the appended drawings.

To the extent that the figures illustrate diagrams of the functional blocks of various embodiments, the functional blocks are not necessarily indicative of the division between hardware circuitry. Thus, for example, one or more of the functional blocks (e.g. processors or memories) may be implemented in a single piece of hardware (e.g. a general purpose signal processor or a block of random access memory, hard disk or the like). Similarly, the programs may be stand-alone programs, may be incorporated as subroutines in an operating system, may be functions in an installed software package, and the like. It should be understood that the various embodiments are not limited to the arrangements and instrumentality shown in the drawings.

As used herein, an element or step recited in the singular and proceeded with the word "a" or "an" should be understood as not excluding plural said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Turning to the figures, FIG. 1, depicted therein are three embodiments 10, 30, 40 of the invented vehicle insert system. Each embodiment shares similar features, with two overall components: an insert 32 and bins 16. The insert comprises a support frame 12 and four shelves 14 attached to the support frame 12. Each of the shelves 14 supports a maximum of six bins 16. The small embodiment also has a base level 18. At least a portion 20 of the base level 18 extends beyond the plane formed by the leading edge of each of the shelves 14. This extending portion 20 of the base level 18 is always accessible, even if all of the shelves are full. While the base 18 protruding portion 20 extends beyond the plane formed by the front of the shelves 14, the base 18 does not extend beyond the opposing, or back plane of the shelves 14.

As can be appreciated in FIG. 1, the bins 16 comprise a material which can incorporate a coloring agent. In the embodiment shown in FIG. 1, the bins 16 are color coded in three categories. A first type of bin 22 is a light color, such as yellow. A second type of bin 24 is a medium intensity color, such as green, and a third type of bin 26 uses a high intensity color such as bright blue. In this embodiment, each bin color is used to designate a particular temperature range for each bin, with a blue bin 26 used for items requiring coldest transport, green bin 24 used for intermediate temperature items, and yellow bins 22 for items not sensitive to temperature changes. The colors are optimized for detection using computer vision, as well as being understood by both computers and humans, including humans suffering from various levels of color blindness, as the bins rely on features other than simply contrast of color but also its intensity.

The smallest embodiment 10 carries four shelves 14 of six bins 16 for a total of twenty-four bins 16. The medium embodiment 30 carries four shelves 14 of fourteen bins 16 for a total of fifty-six bins 16. The largest embodiment 40 carries a variable number of bins 16 per shelf 14. The top shelf 14 contains fourteen bins. The lower shelves 14 carry an additional four bins 16. Finally, the lowest level contains twenty bins 16. With variable loading of the bins 16, the largest embodiment 40 can carry up to 108 bins 16.

The maximum weight of product carried by each bin is 25 lbs. As shown in FIG. 1, each shelf 14 contains bins 16. However, the shelves do not have to stocked exclusively with bins 16. Other substantially rectangular objects, such as a non-bin box 28 can also be placed on each shelf 14. In this way, shelf 14 provides for flexibility in storage and loading.

While several implementations of the vehicle rack are depicted in FIG. 1, the vehicle rack comprises a van rack, a roller rack, a flow rack, a dispenser, a cartridge, a magazine, a general rack, or shelving, in other embodiments.

Grid Details

Figure 2:
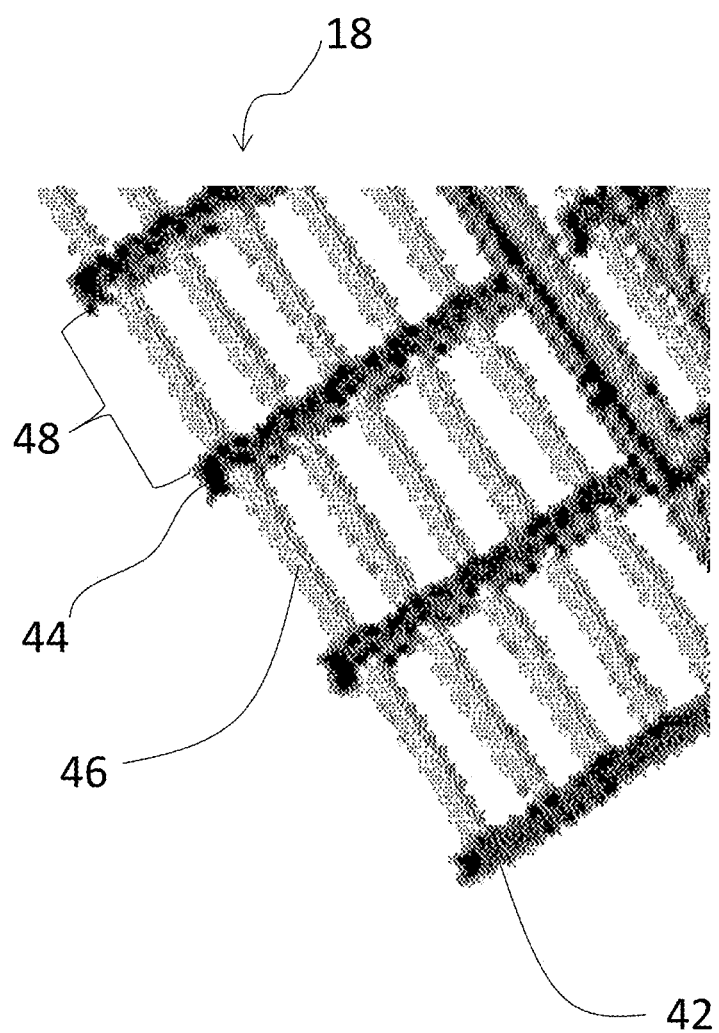
FIG. 2 depicts the details of the base shelf of one embodiment of the invention.

Turning to FIG. 2, depicted therein is a detailed view of a metallic grid 42 used by the base 18. The grid 42 may also be used by the shelves 14, but in one embodiment, the shelves 14 use a lightweight grid, while the base 18 uses heavy duty materials. The grid 42 comprises girders 44 and support bars 46. Two girders 44 and support bars 46 placed within the girders 44 define one grid section 48. In one embodiment, the girders 44 define apertures (not shown) through which continuous support bars 46 are received. In this embodiment, a single support bar 46 spans the entire width of the base grid 42. In another embodiment, each support bar 46 is only the width of a single section 48. In this embodiment, each support bar 46 is received by an appropriate receptacle on the side of each girder 44. For example, in one embodiment each girder 44 side comprises a threaded member and the interior of each bar 46 is a matching threaded receptacle. In this embodiment, the bars 46 comprises a grid section 48 may be joined with the girders 44 as needed.

In one embodiment, each girder 44 spans the total length of the base grid 42. In another embodiment, each girder 44 comprises one or more sections (not shown) which are reversibly joined together. Multiple sections are joined together to form various lengths of girders 44 as needed to form a base grid 42 for different sized embodiments, such as the three different sizes 10, 30, 40 shown in FIG. 1.

The materials for the girder 44 include durable metals such as metal alloys. Similar materials are used for the support bars 46. While in FIG. 2 the two elements are shown in different colors, in one embodiment, both the girders 44 and the support bars 46 comprise the same non-deformable metal substrate. As the two elements are in contact, the metal choices are made to prevent galvanic corrosion between the two. The metal selection is also optimized for maximum weight carry ability versus deformability. In one embodiment, the protruding section 20 of the base 18 (shown in FIG. 1) is additionally reinforced.

Frame Detail

Figure 3:
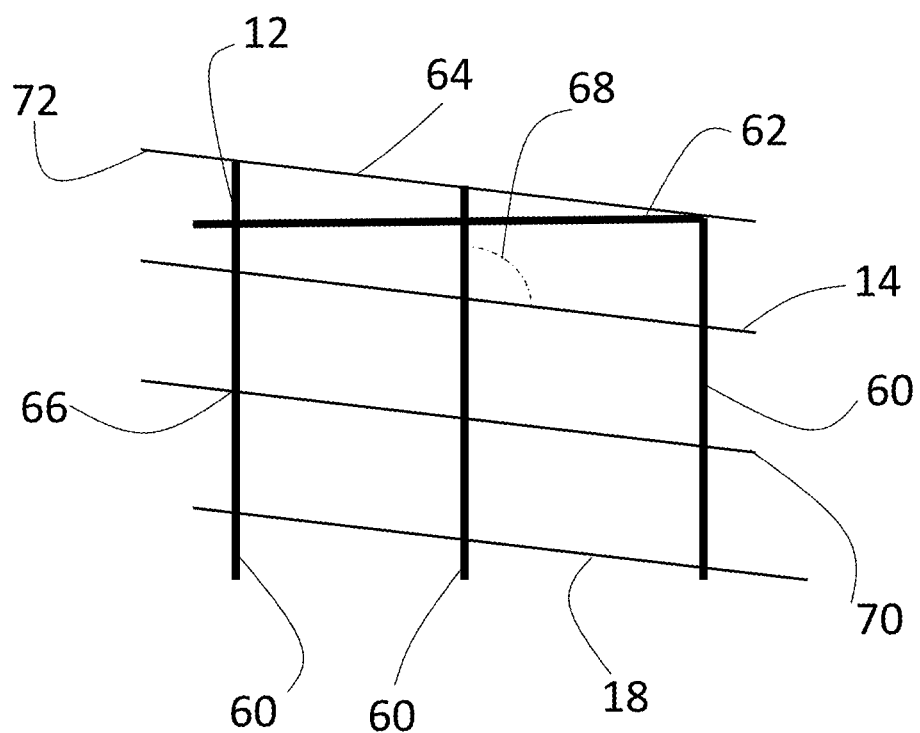
FIG. 3 depicts a side view of one embodiment of the invention.

Turning to FIG. 3, depicted therein is a side view of the mid-sized embodiment 30 of the support frame 12. The support frame 12 comprises three frame vertical members 60. The three vertical members 60 are spanned near the top of the frame 12 by a horizontal member 62. In one embodiment, each vertical member 60 and the vertical member 62 comprise a rolled tube from a non-deformable metal, such as steel or anodized aluminum. The frame 12 members 60, 62 are removably joined in one embodiment. In another embodiment, the frame 12 members 60, 62 are permanently joined, such as through welding. Finally, in one embodiment, the frame 12 comprises a single integrally molded piece, using a process such as additive manufacturing or casting of a single frame 12.

While in the embodiment shown in FIG. 3, the frame 12 comprises three vertical members 60, for a smaller embodiment, such as embodiment 10 shown in FIG. 1, only two vertical members 60 are used.

The vertical members define one or more shelf attachment points 66. The shelves are attached to the frame through mechanical fasteners, adhesive, or a combination of both. The shelves 14 attach to the frame 12 using the fasteners attachment points 66. A top shelf 64 is attached to the top of the vertical members 60 as well as the horizontal member 62, in at least one location.

Similar fasteners are used to attach the base 18 to the frame 12. However, in at least some embodiments, the base 18 comprises a heavier duty grid, and so the fasteners must likewise accept the larger base 18.

The shelves 14 define a proximal or front end 70 and a distal or back end 72. In the embodiment shown in FIG. 3, the angle 68 formed by the shelf 14 and each vertical member 60 is obtuse or greater than 90 degrees. In one embodiment, the angle is 5 degrees.

The angle 68 allows for the front 70 of each shelf to be lower than the back 72 of the shelf. As such, due to the action of gravity, each item placed at the back 72 of the shelf will move towards the front 70 of the shelf. However, the angle is not so high as to result in product moving too quickly or falling off the shelf. In one embodiment, each shelf includes stop guides (not shown), especially at the front 70 of the shelf to prevent the contents of the shelf from falling off. In another embodiment, the sides of the shelf include protective barriers to prevent product from falling off the sides of the shelf. In yet another embodiment, the protective barrier comprises string or rope which is attached to the vertical members 60 and moved along the length of the vertical members 60 to secure the product placed upon the shelves 14.

Vehicle Use Details

Figure 4:
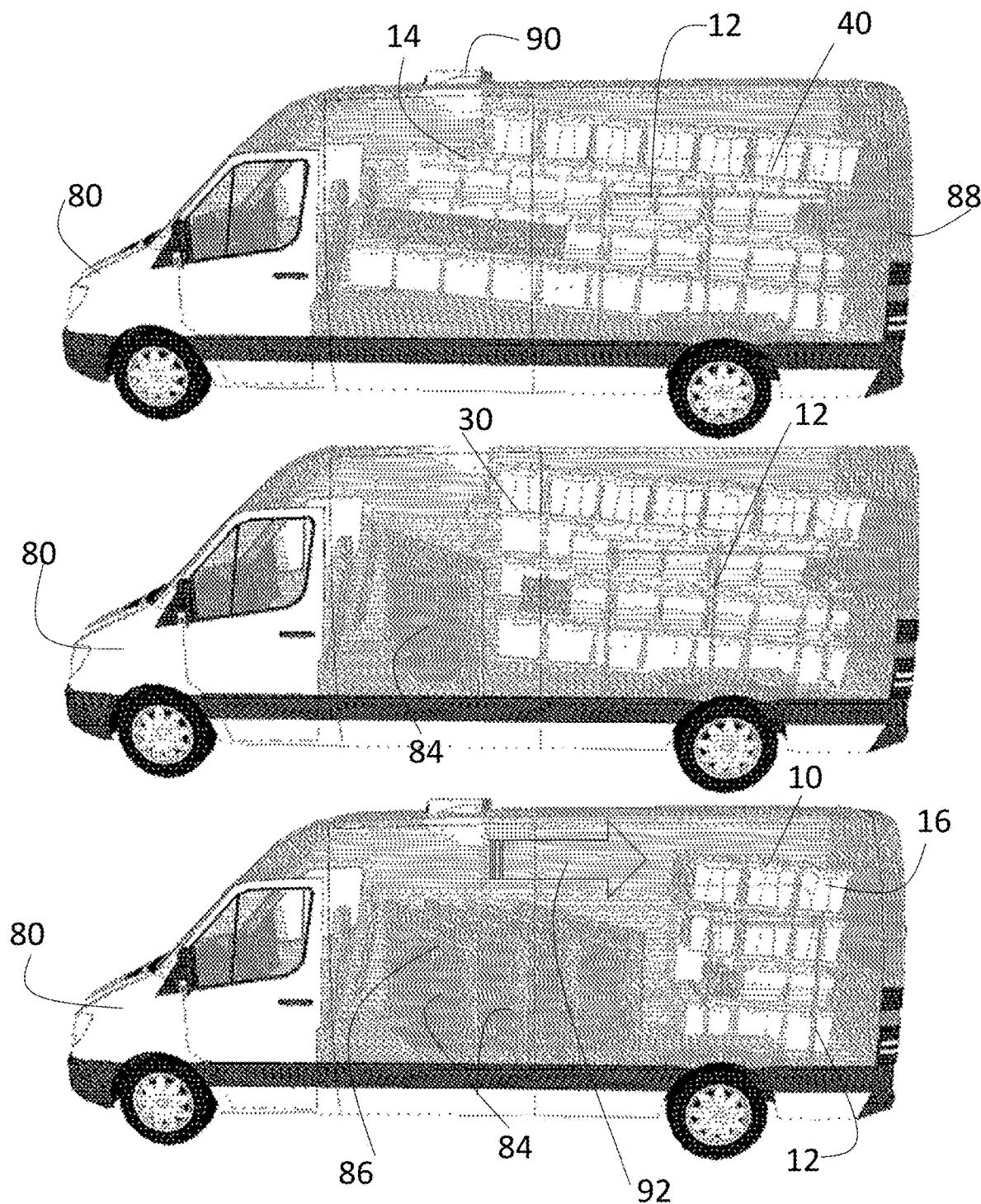
FIG. 4 depicts an overview of several embodiments of the invention.

The use of the frame and shelf combination within a vehicle is shown in FIG. 4. Each vehicle 80 comprises a cargo area 82. The cargo area can house either the smallest 10, or medium 30, or largest 40 embodiment of the invention. The frame 12 and shelf 14 combination is loaded into the cargo area 82 already packed with bins 16 and non-bin boxed items 28.

The size of the embodiment loaded into the cargo area 82 is dependent on the amount of cargo area 82 space required for oversized items 84. The smallest embodiment 10 provides the most flexibility in packing oversized items while the largest embodiment 40 does not allow for any oversized items to be added into the vehicle cargo area.

The vehicle 80 comprises a cargo area cooling system 90. The cooling system is capable of providing sufficient BTUs of cooling. In one embodiment, the cooling system includes ducts (not shown). The cooling system 90 directs the air flow 92 in a substantially horizontal direction. Therefore, the cooling air flow 92 is directed through the contents of the top shelf. In one embodiment, the cooling system 90 duct system provides two cooling air flows 92, directed at two different sides of the top shelf. On a first side, the cooling air flow is substantially colder, resulting in those bins 16 being maintained at a frozen temperature. The second air flow is still cooling, but maintains the bins 16 at a refrigerated temperature, rather than outright freezing.

While the vehicle 80 is depicted as having a cooling system 90, the insert is kept in a climate-controlled environment at time periods it is not found in a vehicle. In one embodiment, the fulfillment center or other location where the insert is being loaded is refrigerated and the insert chambers are cooled to appropriate temperatures. As described herein, the insert includes chambers which require refrigeration and can include chambers that hold frozen products.

In some embodiments, the vehicle 80 is optimized for shipping of non-perishable items, such as clothing or footwear. In these instances, the interior of the vehicle 80 is subject to climate control, to prevent excessive humidity, for example, but the separate cooling system 90 is either not installed, or not enabled. Alternatively, some vehicle embodiments are used exclusively with temperature-sensitive cargo, such as frozen foods or produce that requires refrigeration. In those embodiments, the cooling system 90 is sized appropriately to be able to refrigerate and/or freeze the entire insert or all chambers accordingly.

Each vehicle comprises two cargo area 82 openings, a rear opening 88, and a side opening 86. In one embodiment, the side opening 86 is bilateral, meaning appears on both sides of the vehicle. In other embodiment, the side opening 86 is only on one side of the vehicle, typically the passenger side.

The side opening 86 is used to load and unload the oversized items 84. The rear opening is used to load and unload the inserts 10, 30, 40. As such, the various embodiments should be wide enough to fit through the rear opening 88. In one embodiment, the rear opening 88 doors use floating hinges to allow for the entirety of the width of the cargo area 82 to be accessed when the rear opening 88 doors are actuated.

During deliveries, individual bins 16 are retrieved as needed for each delivery by accessing the shelves at the rear opening 88, courier end, of the vehicle 80. The bins 16 are arranged during loading (described below) such that the items needed for a particular delivery are at the back of the vehicle. The bins 16 are retrieved and delivered as needed. If a bin 16 is not needed or if a delivery fails, the retrieved bin is placed at the back of the shelf by accessing the load end of the shelf through the side opening 86.

In this manner, upon delivery, the driver may also pick up used bins from customer premises, preventing waste and mistaken orders. The empty bins are collapsed and placed on an empty tote cart (not shown) or placed in the back of the shelf, after the new order bin 16 has been delivered. Alternatively, in one embodiment, one or more shelves are designated to receive the return orders. Further, in one embodiment, the empty bins 16 are collapsible and are stored along the sides of the inserts 10, 30, 40 against the sides of the vehicle 80.

In one embodiment, the vehicle 80 is a Mercedes-Benz Sprinter cargo van. In another embodiment, the vehicle 80 comprises a Ford Transit or Connect cargo van. In another embodiment, the vehicle 80 comprises a Dodge Ram cargo van. In other embodiments, a custom vehicle may be used, or a passenger vehicle that has been retrofitted with an appropriate cooling system 90.

While in some embodiment, the vehicle 80 is a van, in other embodiments the rack is used in conjunction with other types of vehicles, including a box truck. In these embodiments, the length, width and height of the insert or rack are increased in any or all dimensions to hold more totes, case packs, etc. This embodiment is loaded into a large box truck with similar refrigeration features described herein. The box truck may have a lift gate to aid the courier (vehicle operator) in reaching the upper portion of the rack.

Loading System Details

Figure 5:
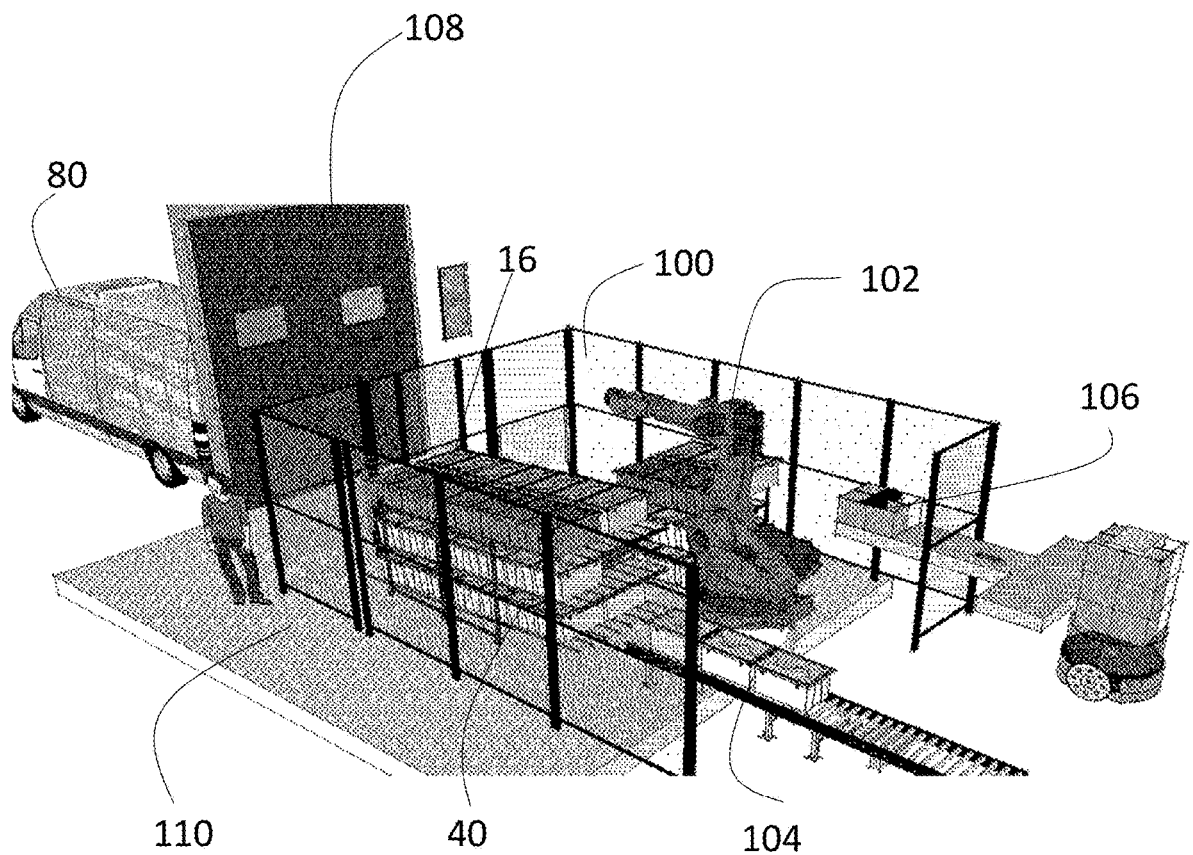
FIG. 5 depicts an overview of the loading and unloading of an embodiment of the invention.

A system for loading of inserts is depicted in FIG. 5. As shown in FIG. 5, each vehicle insert, such as the large insert 40 shown in FIG. 5, is prepared in a secure area 100.

The insert 40 is loaded with the bins 16 by the loading arm 102. In one embodiment, the loading arm 102 is fixed to the floor in the secure area 100. In another embodiment, the loading arm 102 is part of a moveable system. The purpose of the secure area 100 is to prevent injury to system operators and also to prevent loss of product from the bins 16. Further, the walls defining the secure area 100 allow for cooling air to be intensified in the area, especially if the products being loaded into the insert 40 require freezing or refrigeration.

The movable arm moves bins 16 from the source bins 104 to the insert 40, in the order that the items will be unloaded from the vehicle. Specifically, the items to be first removed from the insert 40 will be on the lowest point of each shelf. Items requiring cooling and freezing temperatures will be placed on the top shelf, in the appropriate column. In one embodiment, the column closest to the arm is for refrigerated products while the column further away from the arm is for frozen goods. In one embodiment, the arm is able to pivot 360 degrees and load upon the insert items from both source bins 104 as well as source products 106. In one embodiment, source products 106, case packs, are placed into appropriate bins or onto shelves by the loading arm 102. In another embodiment, the loading arm 102 only loads the insert 40 and does not open or load any of the bins 16.

The source bins 104 or the source products 106 are sent to the secure area 100 using conveyors or by providing the loading arm with pallets. As the loading of the insert is completed by a precise robotic arm 102, each order may contain multiple types of bins requiring different temperatures, as well as non-binned products 106, resulting in a flexible loading and unloading system.

In one embodiment, each bin 16 includes a coded identifier, such as a bar code or RFID tag. The arm 102 upon loading the bin 16 notes the insert 40 which received the bin as well as the time and date of loading.

Once the arm completes loading the insert 40, the insert is released for loading on the vehicle 80. In one embodiment, the insert 40 base level incorporates one or more wheels which allow for the movement of the insert 40 towards the fulfillment center door 108. In another embodiment, rollers in the floor 110 of the fulfillment center facilitate movement of the insert 40 towards the fulfillment center door 108. In yet another embodiment, the loaded insert is moved to the vehicle 80 using a forklift.

The loading of the insert 40 can occur at concurrent secure areas 100 within a single fulfillment center. Further, an insert 40 can be loaded with the required bins and moved to a secondary area, while the robotic arm 102 prepares another insert 40. Upon arrival of the needed vehicle 80, the insert can be ready for loading into the vehicle.

While the above description is for the insert 40 loading process it is the same for inserts 10 and 30, an analogous process can be used for unloading of inserts which have returned to the fulfillment center with empty bins or bins containing returned items.

Method of Use

Figure 6:
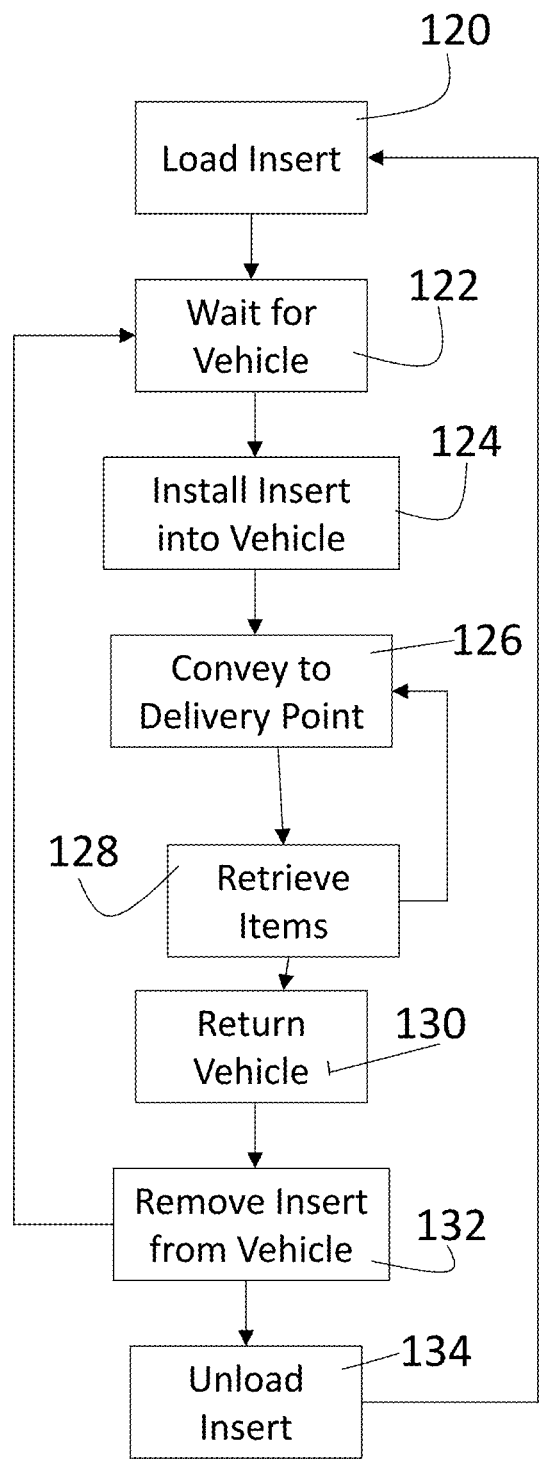
FIG. 6 depicts a flow chart of use of an embodiment of the invention.

The process of loading, delivering, and unloading merchandise is described in the flowchart shown in FIG. 6. While the process shown in FIG. 6 is sequential, several of the steps can occur concurrently, and several of the steps may be undertaken by multiple acting agents concurrently, such as multiple loading robotic arms or multiple deliveries occurring concurrently using many vehicles.

The process beings with loading of an insert 120. The insert is loaded with products contained in bins and without bins. Each item added to the insert 120 is associated with a delivery order. Once the insert is fully loaded, the system waits for an available vehicle 122 or otherwise queues the insert to be loaded onto a vehicle. The size of the insert 120 to be loaded is determined by the requirements of the delivery to be completed, as well as the quantity and size of oversized items to be included within the order.

Once a vehicle is available, the loaded insert is securely installed 124 into the vehicle. As the insert comes loaded and the vehicle includes the necessary attachment points, such as structural bolts, the insert can be installed in the vehicle in an expedited manner.

With the loaded insert, the vehicle proceeds to the first delivery point 126. Upon reaching the intended delivery point 126, the cargo area of the vehicle is accessed. If the item to be delivered is in a bin on a shelf, the back of the vehicle is accessed. If the items to be delivered is an oversized item, the side door of the vehicle is opened and the appropriate oversized item is retrieved 128. The item is then delivered. Upon completing the delivery, the vehicle is conveyed to the next delivery 126.

Once the deliveries are completed, the vehicle is returned 130. The insert is removed from the vehicle 132. If there were any items on the insert, they are removed 134.

The system can, therefore, begin loading the insert for the next order, as required.

Van Rack Details

Turning to FIGS. 7A-D depicted therein are several views of insulated van rack panels. In one embodiment, the width of the insulated van rack panel is 52 inches and the height is 35 inches.

Figure 7A:
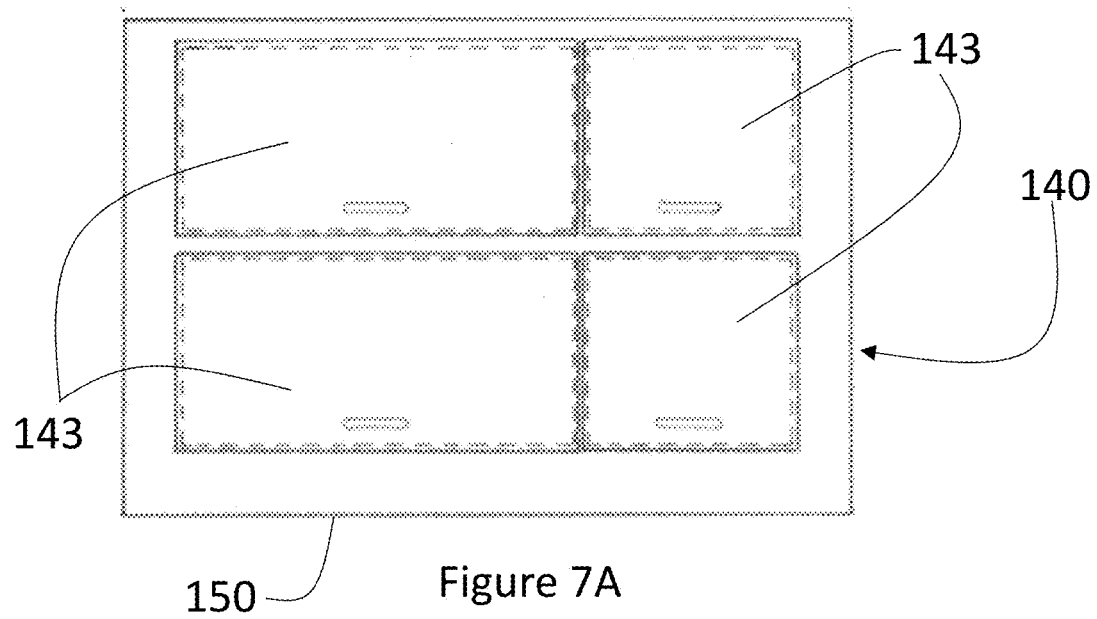
FIGS. 7A-D depict several views of a van rack, pursuant to one embodiment of the invention.
Figure 7B:
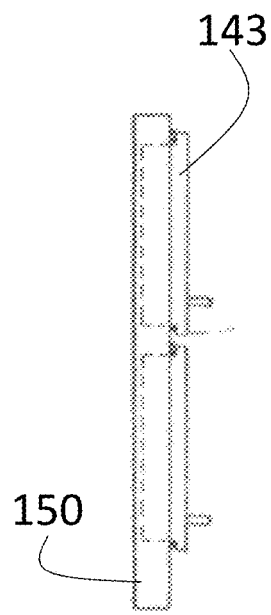

As shown in FIG. 7A, the embodiment depicted therein uses an insulated panel 150 which comprises four insulated van rack access doors 143 in the courier end view 140. The side view of the embodiment showing the insulated panel 150 and insulated van rack access doors 143 is depicted in FIG. 7B.

Figure 7C:
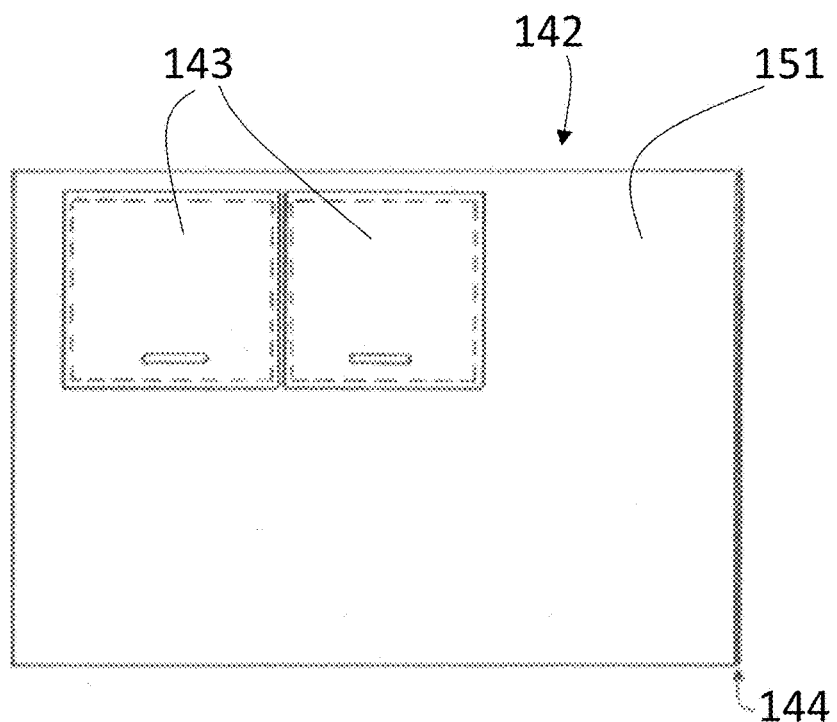

The embodiment shown in FIG. 7C, the insulated van rack panel door 151 comprises two insulated van rack access doors 143. As can be seen from the side view depicted in FIG. 7D, the insulated van rack panel door includes insulated van rack access doors 143, which are fixed to the surface 151.

The load end view 142 also depicts the hinge 144 which is received along one side of the van rack and insulated panel door 151 to swing the end open. The load view 142 likewise includes insulated van rack access doors 143.

Figure 7D:
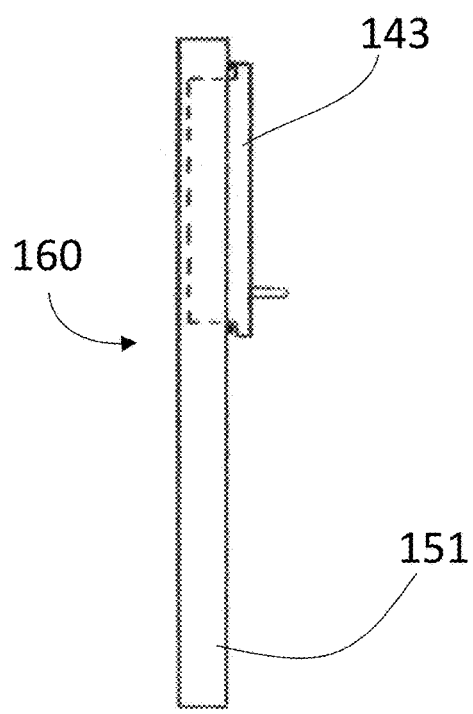

As shown in FIG. 7D, the load end door profile view 160 shows a single insulated panel door 151, the front of which is shown in FIG. 7C.

Flat Shelf Embodiment

Figure 8:
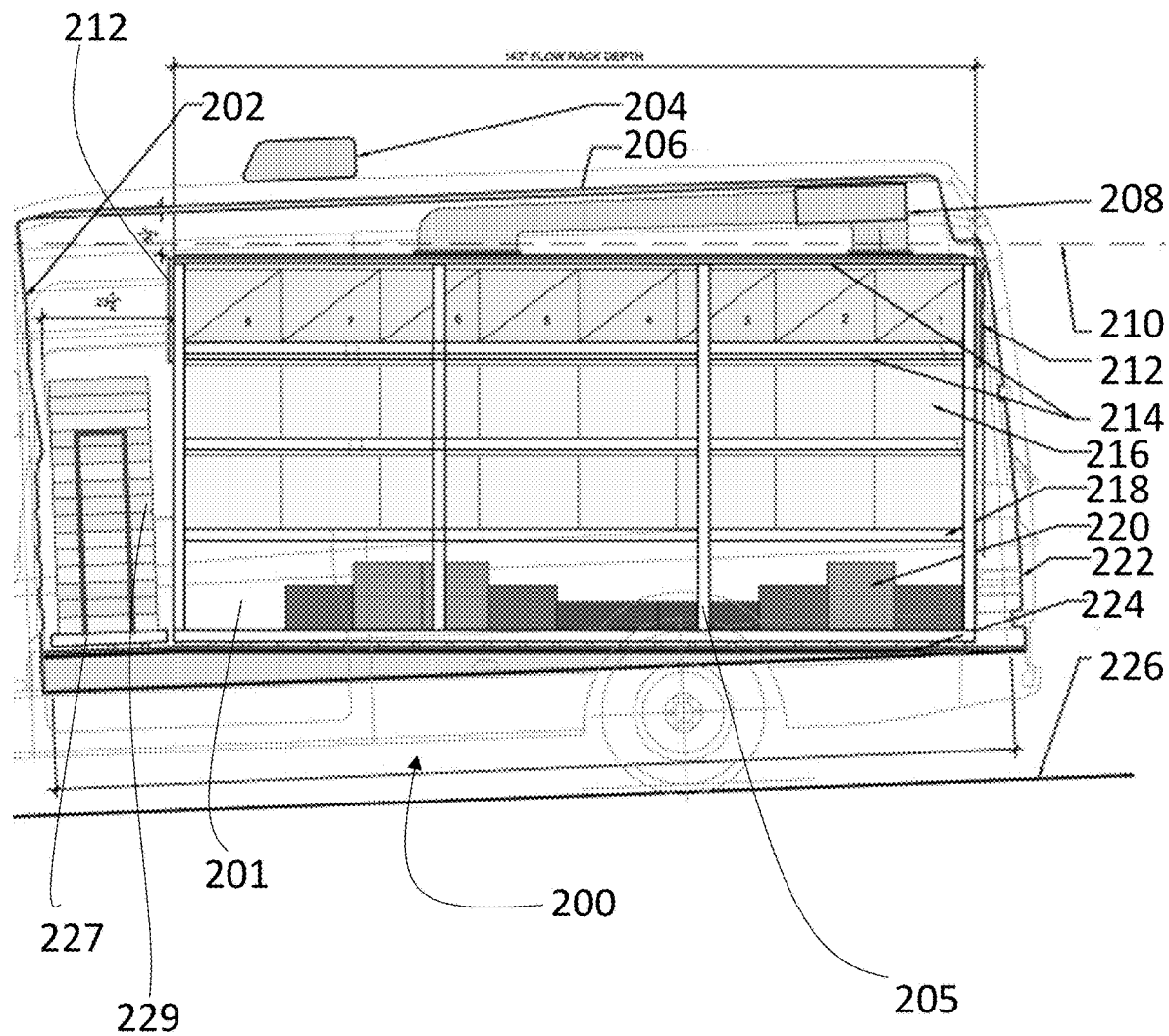
FIG. 8 depicts a side view of an alternative embodiment of the invention.

Turning to FIG. 8, depicted therein is a side view of a van 200 containing an alternative embodiment of the invented system. The embodiment of FIG. 8 and subsequent figures operates on the same main ideas as the earlier embodiments, except it includes shelves which are not installed at an angle. Instead, the insert (Van Rack) sits on an insulated sloped floor.

The embodiment shown in FIG. 8 comprises a van having a driver compartment 202 and a cargo compartment 201. The driver compartment 202 is not shown in detail in the drawing. The cargo compartment 201 includes a van rack having a number of shelves. The upper interior of the van 200 has evaporators 208 in fluid communication with a condensing unit 204. The condensing unit 204 sits on an insulated roof 206. Below the insulated roof are air ducts with the evaporators cooling air within chambers in the van rack 205. The ends of the air ducts are booted to mate with openings to the chambers in the insulated top panel for automatic docking when the van rack is rolled in and secured in place. The cooled air chambers in the van rack connect to a booted supply and return air ducts to provide 35 degree air over the totes in some chambers while another set of ducts provide −20 degree air to chambers with frozen totes. The chambers are separated by insulated partitions. In one embodiment, the evaporator 208 is 24 inches. The air ducts include a booted feature which comprises an oversized flexible gasket, which is located at the interface between the ducts and the insert. The flexible gaskets are oversized to allow for a partial seal without requiring exact precision in alignment.

The rack includes a door clearance level 210, which allows the rack to clear the floor 224 and the evaporator 208. As the rack is substantially rectangular without the sloping shelves of the earlier embodiment, the clearance 208 level is likewise a straight horizontal line.

The back and front of the van rack 205 include insulated doors 212, as shown in FIG. 7. The van rack 205 also includes insulated panels 214 above and below the low-temperature area of the rack.

Below the temperature controlled areas defined by the insulated panels 214, the rack shelves 218 hold a number of totes 216. In the depicted embodiment, the shelves 218 are roller shelves.

The rack is also capable of carrying non-tote items, such as case packs 220 of various dimensions. The totes 216 are designed to be uniform and to use the space defined by the shelves 218 with maximum efficiency.

The van 200 also defines an exterior door 222 surface and a floor 224 which is also insulated. As shown in the side view of FIG. 8, the embodiment is 143 inches in width.

As the shelves and the rack is non-angled, during loading, the van 200 is placed on an angled ramp 226. In one embodiment, the angle of the ramp 226 is analogous to the angle of the shelves from the first embodiment.

In another embodiment there is no sloped floor or angled ramp. The van has a hydraulic suspension system that lowers the rear of the van allowing the totes to flow towards the courier at the rear of the van. With or without a sloped floor the van hydraulic suspension system holds the van at a fixed height during van rack loading.

As shown in FIG. 8, the totes are substantially rectangular, having dimensions of height 12½ inches, depth of 10½ inches, and width of 17½ inches in one embodiment.

As shown in FIG. 8, immediately behind the driver compartment 202, there is a designated location 227 for a cart holding a stack of empty and collapsed totes 229.

In one embodiment, oversized items are accommodated by using shorter inserts (not shown).

In one embodiment, the interior area of the van is temperature controlled between 65 to 75 degrees, depending on the time of year.

Temperature control of the significant vehicle interior spaces (the insert area and the refrigerated chambers in the insert), is performed automatically from a dispatch center, in one embodiment. The dispatch center observes the current temperature of the interior of the delivery vehicle and adjusts the cooling systems accordingly. The dispatch center also receives regular sensor readings from the vehicle, and so the dispatch center can generate a report showing the cold transit chain, if needed, for particular cargo. In one embodiment, such a report is prepared for highly sensitive cargo, such as temperature-sensitive medicines. In other embodiments, the vehicle operator console also allows the vehicle operator to view a report on the temperatures in the insert area and of the product chambers in the insert during transit, as well as changing the settings in the climate control systems, as necessary.

Figure 9:
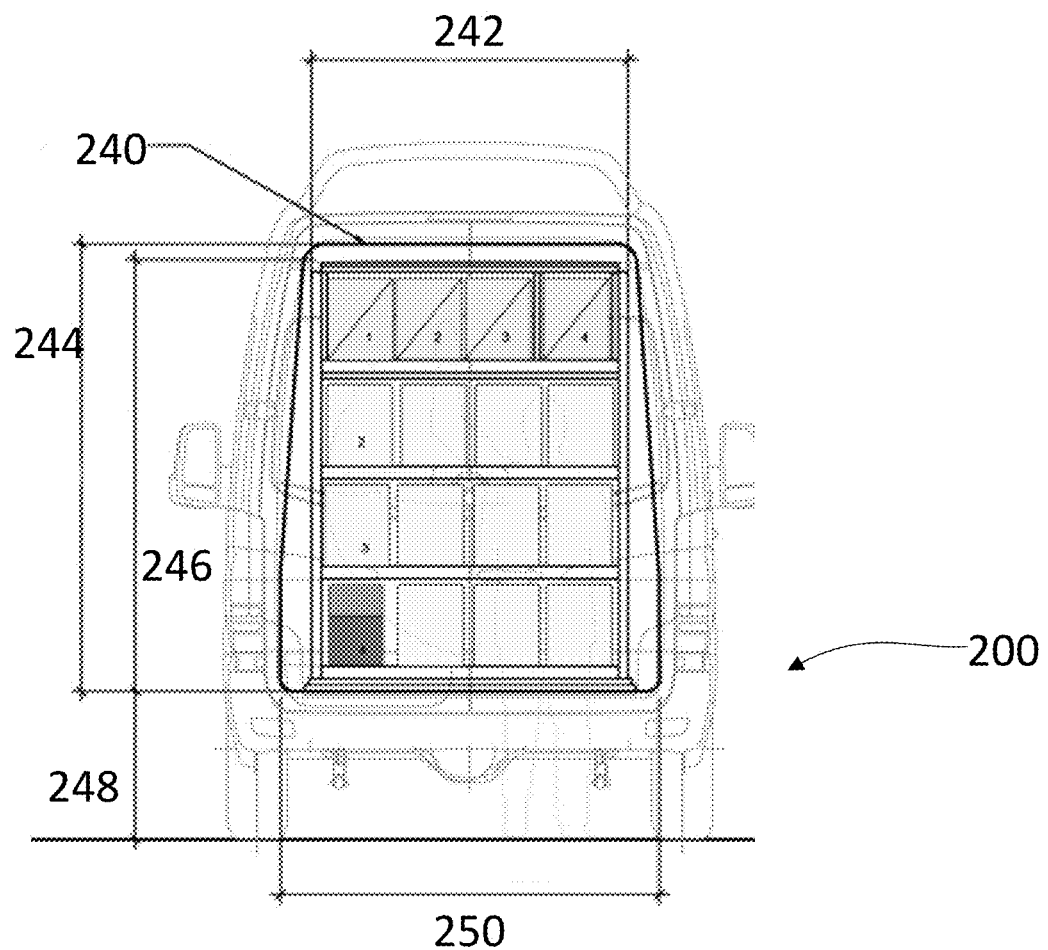
FIG. 9 depicts a back view of an alternative embodiment of the invention.

The rear of the van is shown in FIG. 9. The van 200 comprises a door opening 240. In one embodiment, the rack width 242 is 51 inches. The rack height 246 is 66½ inches. The door 240 vertical clearance 244 is 72 inches. The ground to door ramp height 248 is 25½ inches to 23¾ inches. The door 240 horizontal clearance 250 averages 60½ inches. Therefore, the rack allows for highly efficient use of the interior of the van.

Figure 10:
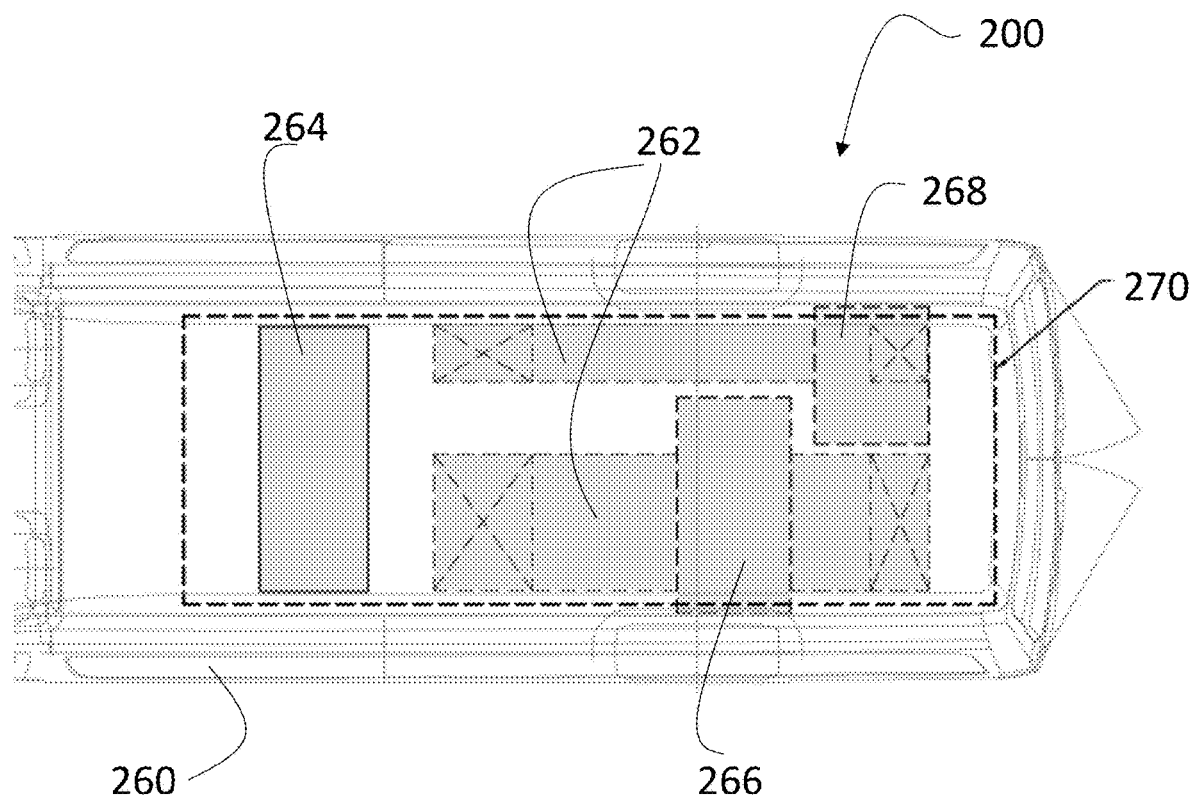
FIG. 10 depicts a top view of an alternative embodiment of the invention.

Turning to the view of FIG. 10, depicted therein is a top view 260 of the van 200. The top of the van comprises a condensing unit 264 and two evaporator units 266 and 268. The two evaporator units are in fluid communication with the air flow channels 262. In one embodiment, the first evaporator 266 is a 36" evaporator and the second evaporator 268 is a 24" evaporator.

Each evaporator 266, 268 is designated for a different temperature zone within the van rack 270.

Tray Track and Anti-Pushback

Turning to FIGS. 11A-F, depicted therein are the details of the tray tracks (rollers) and anti-pushback features.

Figure 11A:
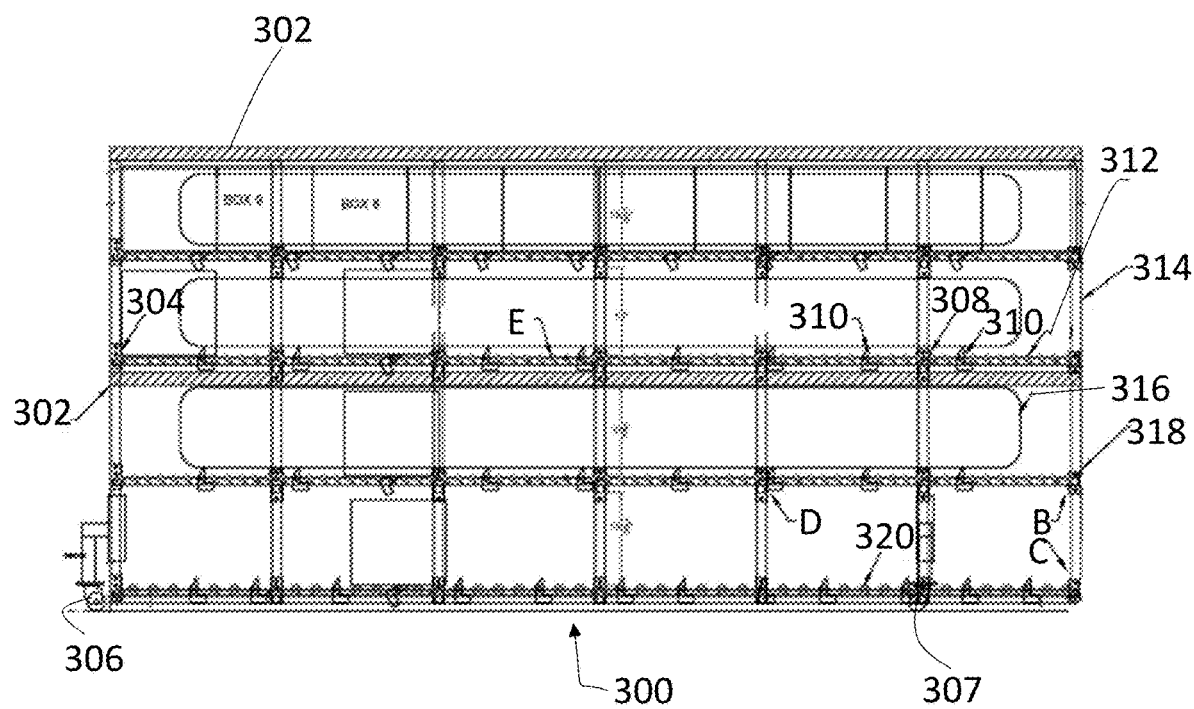
FIGS. 11A-F depict detailed views of an alternative embodiment of the invention.

As shown in FIG. 11A, a side view 300 of the van rack is presented. The rack includes top, intermediate and side insulation 302. In the depicted embodiment, the insulation 302 comprises 2" to 4" of foam insulation such as polyurethane foam insulation. In proximity to the interior surface of the insulation 302, a rear beam for the rack 304 is located. In one corner of the rack, a wheel 306 supported by a base is located. Another wheel 307 extends below the bottom horizontal plane of the van rack side view 300 near the opposite end of the rack. The front of each shelf defines a front beam with integrated stop 318.

In a first section of the shelf, an intermediate beam 308 is located. The intermediate beam 308 attaches each shelf to the van rack 300. In proximity to the intermediate beam 308, the anti-pushback devices 310 are located on the shelf of the van rack 300. Each shelf comprises a set of tray tracks 312. The van rack 300 also defines an upright frame 314 which supports each tray track and the insulation 302.

Each shelf further accommodates a full-length divider 316.

Several of the shelves use a smaller flex track or rollers 312.

Figures 11B, 11C:
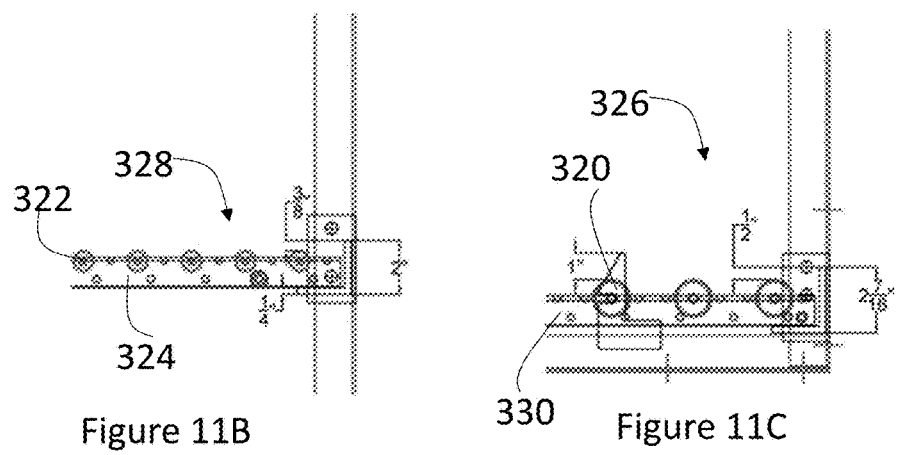

The details of the smaller flex track 312 are shown in FIG. 11B. The location of the detailed view shown in FIG. 11B are depicted in FIG. 11A as element CB'. The smaller flex track 328 comprises rollers 322 embedded on a substrate 324. In one embodiment, the total height of the flex track 312 is 2 inches with a clearance of ¼ of an inch on the bottom and ⅜ of an inch on top.

The details of the larger flex track 326 are shown in FIG. 11C, which is an enlargement of the area 'C' of FIG. 11A. The large track 326 includes wheels 320 and supporting substrate 330, however, the rollers 320 are sparser than in the smaller flex track 312 of FIG. 11B.

Figure 11D:
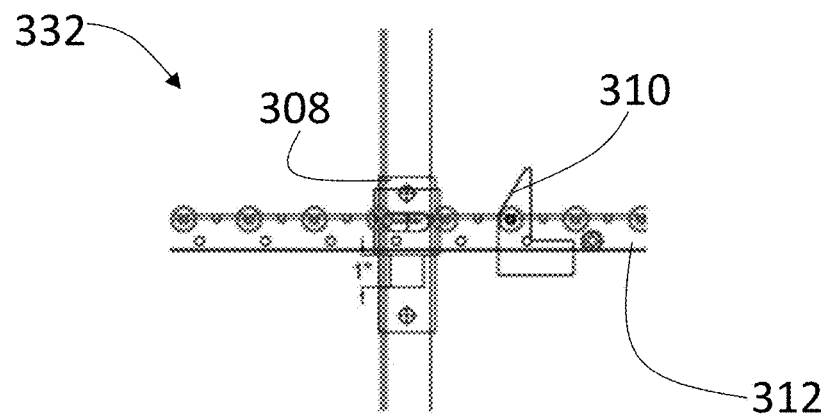

FIG. 11D depicts a detailed view 332 of the intermediate beam 308 and anti-pushback device 310 located on the device at point D shown in FIG. 11A. The two are used in conjunction with the smaller flex track 312 depicted in FIG. 11B, in one embodiment. In another embodiment, the anti-pushback device is used in conjunction with the larger track.

Figure 11E:
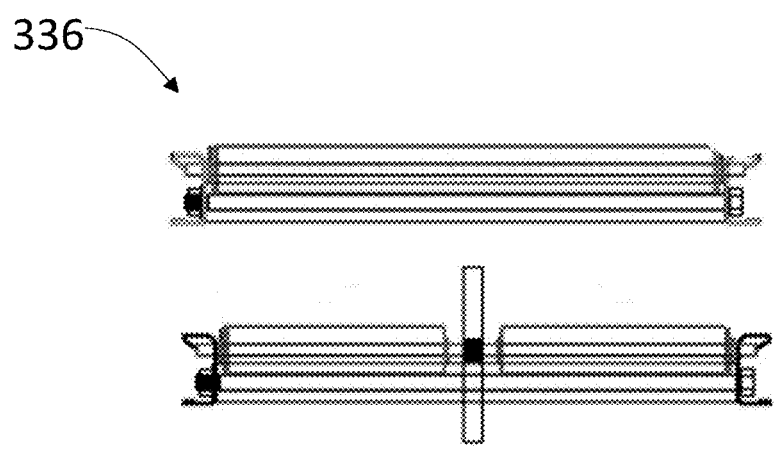

FIG. 11E depicts a detailed view 336 of the shelves at point E in FIG. 11A.

Figure 11F:
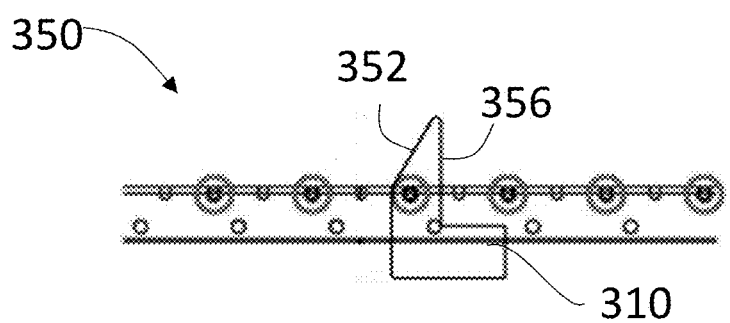

FIG. 11F depicts a detailed view 350 of the anti-pushback device 310. The anti-pushback device defines an angled section 352 and a straight section 356. Product totes may pass over the angled section 352 but will not pass over the straight section 356. Instead, they will rest against the straight section 356, even if a significant amount of force is applied, as would happen if the vehicle were to brake suddenly.

Figure 11G:
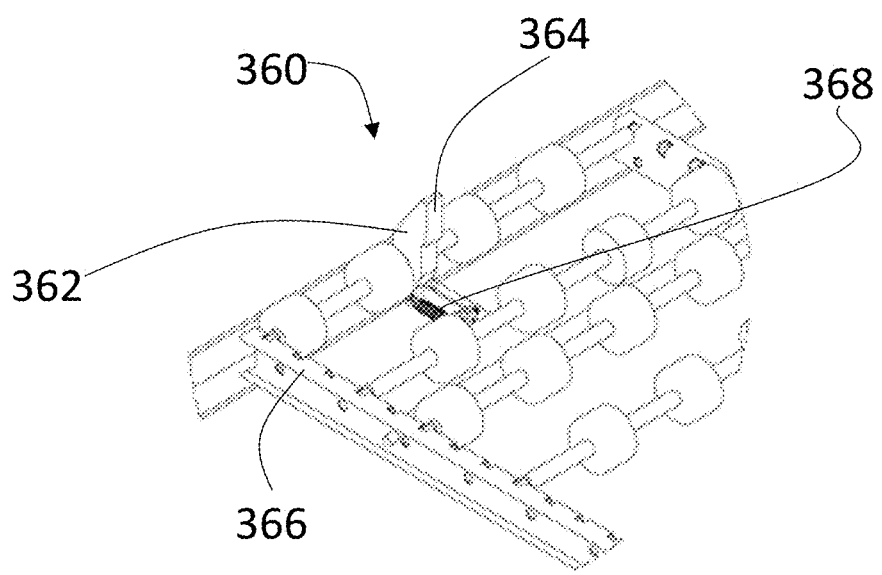
FIGS. 11G-H depict detailed views of another alternative embodiment of a component of the invention.
Figure 11H:
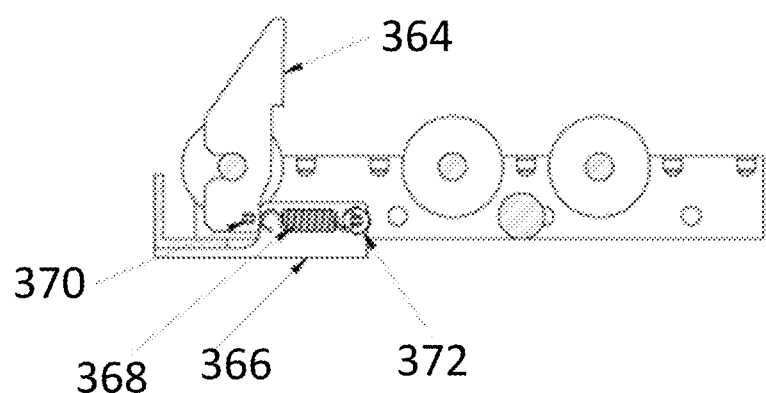

FIGS. 11G-11H depict a spring loaded rear stop 360 pursuant to one embodiment of the system. The spring-loaded rear stop 360 is used in place of other anti-pushback devices. FIG. 11H is a side view of FIG. 11G.

As shown in FIG. 11G, the spring loaded rear stop 360 comprises a flange 362 with a push back surface 364. The push back surface 364 contacts bins and other containers on the rack 366. The lateral movement of the flange 362 is limited by action of the spring 368. If the flange 362 is pushed down, the spring 368 will exert a force to return the flange 362 to the upright position.

The details of the attachment of the spring 368, the rack 366 and the flange 362 are shown in FIG. 11H. A first end 370 of the spring is attached to the flange 362. The opposite end 372 of the spring 368 is attached to the rack 366, using a suitable fastener, such as a hex nut shown in the drawing.

The van rack includes locking casters to ensure that while being loaded and being transported into the vehicle, the rack can move with ease. The resulting rack is capable of moving 2000 pounds of product, without creating a danger to the operator. The casters, in one embodiment, include an auto-locking feature, such that while the operator does not intend to move the rack, the wheels are locked in place. In this way, the rack is safe and easy to use and ensures that any process which uses the rack is ergonomically sound. During transit to customers, the van rack is secured to the floor to further prevent movement.

Lifting of Rack

Figure 12A:
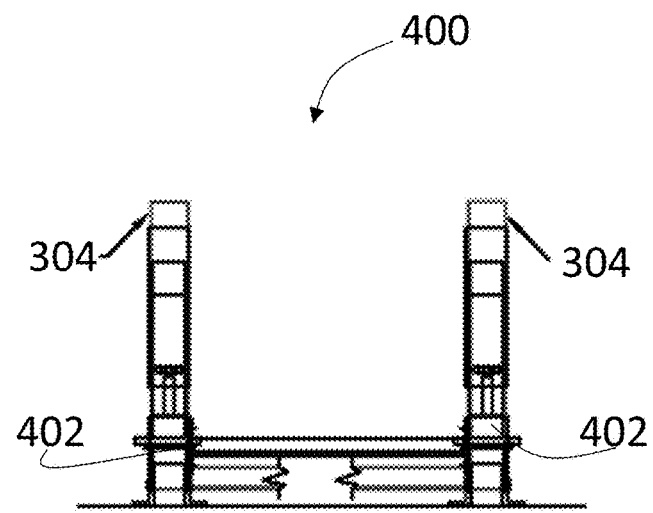
FIGS. 12A-C depict details of the operation of the lifting of an alternative embodiment of the invention.
Figure 12B:
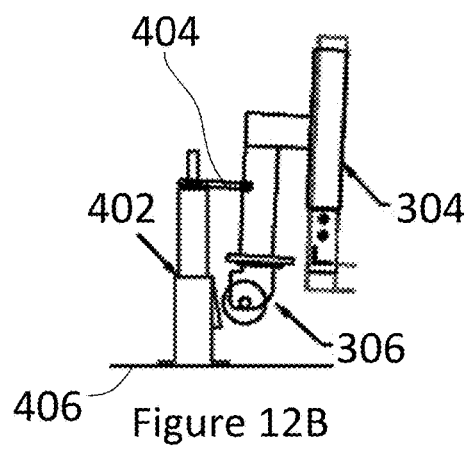
Figure 12C:
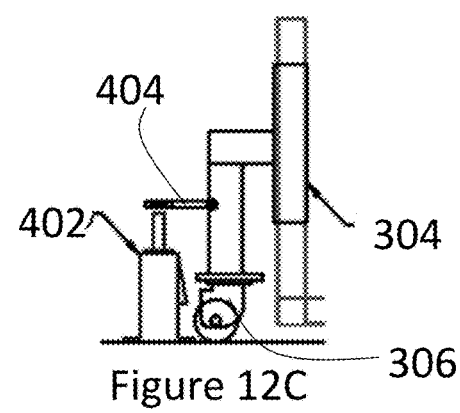

Turning to the details of the jack operations shown in FIG. 12A-C, the load end 400 of the rack, shown in FIG. 12A may be propped up by two jacks 402. The load end 400 includes the rear vertical beam 304.

The rack includes a side rack support substrate 404, which is used to interface the rack with the jack 402, as shown in FIGS. 12B and 12C. The rack then is lifted such that the wheel 306 is raised above the ground level 406 on which the rack and jack 402 rest.

The jack 402 is an industrial-strength bottle jack, in one embodiment.

Load End View

Figure 13A:
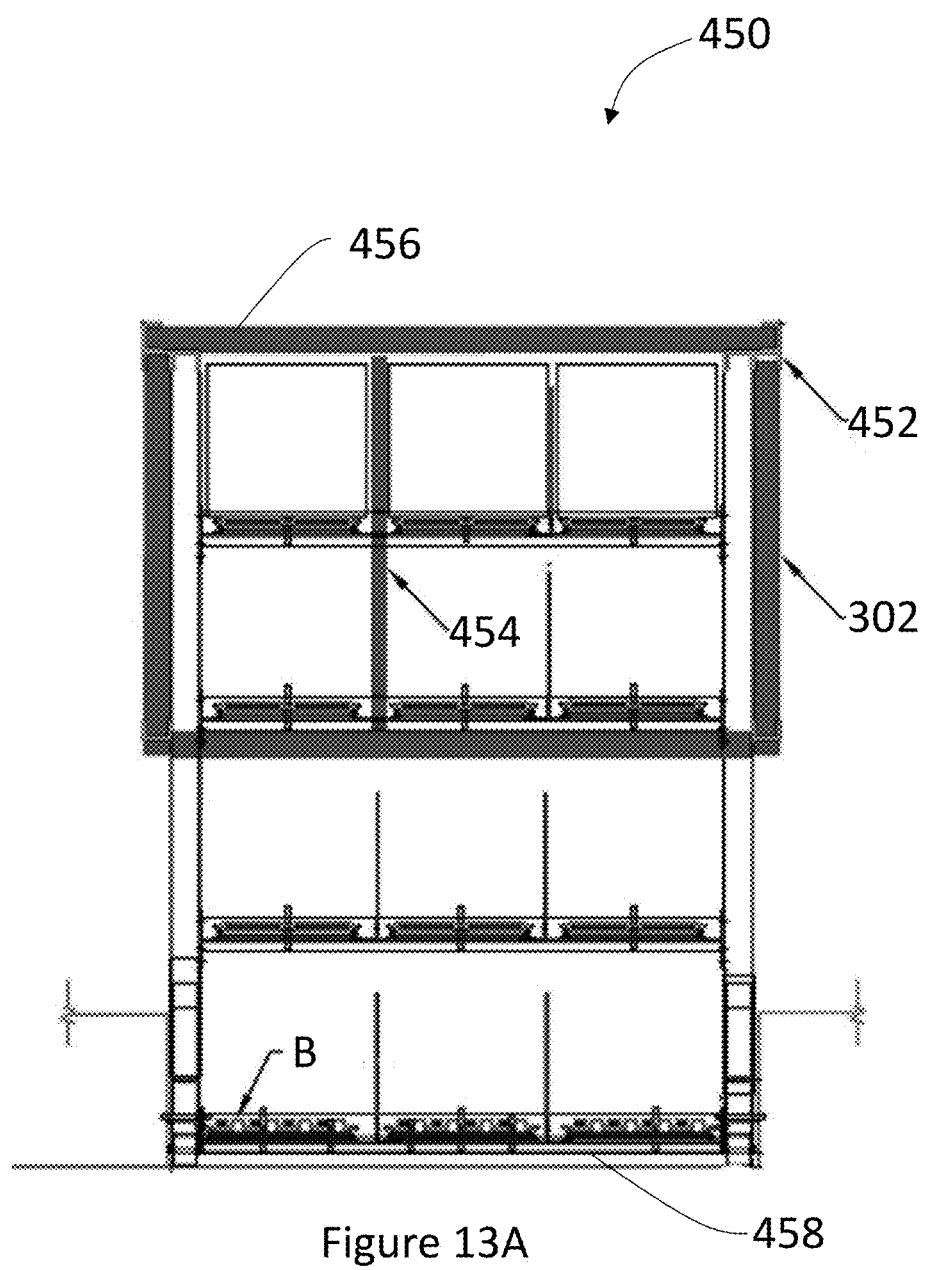
FIG. 13A-B depict a back view of an alternative embodiment of the invention.
Figure 13B:
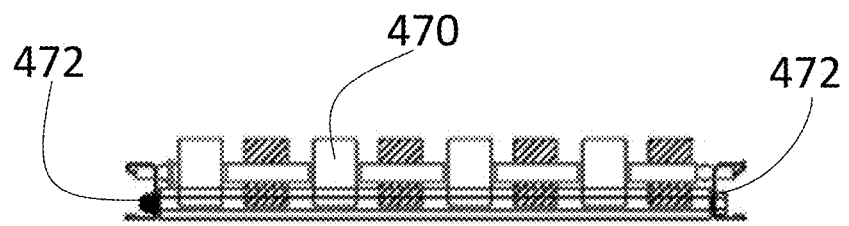

Turning to FIG. 13A, depicted therein is a load end view of the rack 450. The end view depicts both the top, intermediate and side insulation 302 as well as secondary insulation support channels 452. The interior of the rack also includes interior insulation 454. In one embodiment, the interior insulation 454 comprises 1" insulation, while the insulation 302 comprises 2" insulation. In one embodiment, as seen from the load end view 450, the rack width, including insulation is 52 and ¹⁄₁₆ of an inch, at the top 456 while the width is 47½ inches at the bottom 458. A detailed view of the bottom rollers of the rack is shown in FIG. 13B, focusing on the area designated in FIG. 13A with the letter B. The lowest level comprises movable rollers 470 and fixed supports 472.

Overall, the system accommodates products having diverse temperature requirements in a single vehicle. The system provides improved ergonomics, due to the use of slanted shelves. While the system is optimized for products conveyed in bins, it can also transport oversized items, both on the shelves and off the shelves in the vehicle cargo area. The system allows for loading and unloading to be optimized for the vehicles available for the deliveries and provides some flexibility in interior layouts by using three sizes of the inserts. The system allows for full use of the height of the small-scale delivery van within dangerous shifting stacks of bins or product.

The system allows for highly efficient use of the van storage area by maximizing the storage density of the van cargo area. The system presents the containers to the driver in a precise order and allows for retrieval of exact delivery components. The containers can include bins, totes, trays, cartons, boxes, bags, products, or combinations thereof.

The system can be used in conjunction with other assistance devices and methods. In one embodiment, the insert has mounted on it an unload assist system to facilitate removing bins from the topmost shelves.

In one embodiment, the vehicle comprises a step bumper to allow the operator access to the topmost shelves. The bumper is designed to withstand the combined weight of the driver and the maximum load of one item or bin.

In one embodiment, a fulfillment center where a vehicle is loaded or unloaded includes a customized loading dock plate to guide the insert into a docked vehicle. The dock plate covers any gaps between the loading dock surface and the parked vehicle. The plate includes customizations, including raised edges and markings, to ensure that the dock plate is installed correctly and that the rack will be installed into the vehicle at the correct location.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting, but are instead exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the terms "comprising" and "wherein." Moreover, in the following claims, the terms "first," "second," and "third," are used merely as labels, and are not intended to impose numerical requirements on their objects. Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure.

The embodiment of the invention in which an exclusive property or privilege is claimed is defined as follows:

1. A system for loading of a vehicle comprising:
    a facility having at least one source bin of products to be moved;
    the vehicle operated by a driver and wherein the vehicle includes at least one rear door;
    at least one loading arm having access to at least one product from the source bin of products, and;
    at least one vehicle insert;
    wherein the loading arm transfers the at least one product from its source bin to the at least one vehicle insert;
    wherein the loading arm loads the at least one product on the insert;
    wherein each vehicle insert comprises:
    two frames defining a vertical member and one or more horizontal members; and
    multiple roller shelves attached to the frames;
    wherein the shelves hold one or more containers and wherein the containers hold products;
    wherein the shelves facilitate unloading by presenting the containers to the vehicle's driver at the vehicle's rear door for retrieval and wherein the insert is wheeled into the vehicle already loaded with containers to be delivered;
    wherein the shelves slope towards the rear door of the vehicle to aid movement of the containers to the rear door of the vehicle.

2. The system of claim 1 wherein the containers comprise bins, totes, trays, cartons, boxes, bags, products, cases, bundles of shrink wrapped products, or combinations thereof.

3. The system of claim 1 wherein the shelves comprise an air-permeable grid.

4. The system of claim 1 wherein the frame comprises girders which are interlocked together to form multiple inserts having several different lengths.

5. The system of claim 1 wherein the containers protect the products during delivery.

6. The insert of claim 1 wherein said vehicle further comprises variable refrigeration and air exchange systems and wherein a portion or all of the installed insert defines a single or multiple air cooling zones, for chilled or frozen products, or said insert may have no cooling zones, and wherein the refrigeration and air exchange systems can be turned off entirely.

7. The system of claim 1 wherein a van rack comprises the insert and the containers allow for careful handling of the products thereby reducing required packaging on the products to get the products safely to at least one customer thereby eliminating a cardboard box with filler.

8. The system of claim 1 wherein the insert is secured to a floor of the vehicle to prevent movement in the vehicle.

9. The system of claim 1 wherein the insert is rolled into the vehicle manually, using a pallet jack or by using a tugger, resulting in the vehicle loading and unloading being fast, safe, and ergonomic, the vehicle's air ducts simultaneously connect to the insert upon its installation.

10. The insert of claim 1 further comprising an enclosure containing said insert wherein said enclosed structure includes insulated chambers with insulated doors.

11. The insert of claim 1 wherein said vehicle incorporates one or more air circulating climate control systems and where the insert has multiple air cooling zones and wherein a vehicle dispatch system or the vehicle's driver console monitors and controls the temperatures and humidity in each of the various cooling zones of the climate control systems.

12. The system of claim 1 wherein each of the inserts are removable for ease of loading, unloading, handling of returns, and cleaning.

13. The system of claim 1 wherein upon removal of a first insert, a second insert, already loaded with products by the loading arm, can be moved into or onto the vehicle and driver is quickly back to other tasks.

14. The system of claim 1 wherein a vehicle operator can interact with all shelves of the insert accessible from the rear door of the vehicle within the vehicle without any need to use a step ladder or lift, to access or unload the vehicle.

15. The system of claim 1 wherein the insert further comprises an unload assist system to aid the vehicle driver when unloading the insert's topmost shelves.

16. The system of claim 1 wherein the loading arm transfers products to the insert in an order that the products will be unloaded from the vehicle.

17. A system for loading of a vehicle driven by a driver comprising:
    at least one vehicle insert comprising:
        two frames defining a vertical member and one or more horizontal members; and
    multiple shelves attached to the frames;
    wherein the shelves hold one or more containers and wherein the containers hold products;
    wherein the shelves facilitate unloading by presenting the containers to the vehicle's driver at the vehicle's rear door for retrieval and wherein said insert is wheeled into the vehicle already loaded with containers to be delivered
    wherein the shelves of the insert slope towards the rear door of the vehicle upon loading of the insert into the vehicle.

\* \* \* \* \*